US007829194B2

(12) United States Patent
Brady et al.

(10) Patent No.: US 7,829,194 B2
(45) Date of Patent: Nov. 9, 2010

(54) IRON-BASED ALLOY AND NITRIDATION TREATMENT FOR PEM FUEL CELL BIPOLAR PLATES

(75) Inventors: Michael P. Brady, Oak Ridge, TN (US); Bing Yang, Oak Ridge, TN (US); Philip J. Maziasz, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 788 days.

(21) Appl. No.: 11/582,034

(22) Filed: Oct. 17, 2006

(65) Prior Publication Data

US 2007/0099012 A1    May 3, 2007

Related U.S. Application Data

(63) Continuation-in-part of application No. 10/403,472, filed on Mar. 31, 2003, now Pat. No. 7,211,346.

(51) Int. Cl.
B32B 15/04       (2006.01)
B05D 5/12        (2006.01)
(52) U.S. Cl. ............... 428/457; 428/698; 427/126.1; 429/34; 429/35
(58) Field of Classification Search ............... None
See application file for complete search history.

(56) References Cited

U.S. PATENT DOCUMENTS 3,837,894 A  *  9/1974   Tucker, Jr. ............... 427/419.2
3,841,847 A     10/1974  Jones et al.
4,882,124 A  *  11/1989  Uehara et al. ............ 420/74
5,328,529 A  *  7/1994   Cordea et al. ............ 148/327
5,445,683 A     8/1995   Tahara et al.
5,683,828 A     11/1997  Spear et al.
5,798,188 A     8/1998   Mukohyama et al.
2001/0039984 A1 11/2001  Nomomura et al.
2002/0057984 A1 5/2002   Speidel et al.
2002/0081478 A1 6/2002   Busenbender (Continued)

OTHER PUBLICATIONS

C.C. Wang et al. Journal of the Electrochemical Society, Mar. 2003, 150 (5), B199-B204.*

(Continued)

*Primary Examiner*—Jennifer C McNeil
*Assistant Examiner*—Vera Katz
(74) *Attorney, Agent, or Firm*—Novak Druce + Quigg LLP; Gregory A. Nelson; Gregory M. Lefkowitz

(57) ABSTRACT

A corrosion resistant electrically conductive component that can be used as a bipolar plate in a PEM fuel cell application is composed of an alloy substrate which has 10-30 wt. % Cr, 0.5 to 7 wt. % V, and base metal being Fe, and a continuous surface layer of chromium nitride and vanadium nitride essentially free of base metal. A oxide layer of chromium vanadium oxide can be disposed between the alloy substrate and the continuous surface nitride layer. A method to prepare the corrosion resistant electrically conductive component involves a two-step nitridization sequence by exposing the alloy to a oxygen containing gas at an elevated temperature, and subsequently exposing the alloy to an oxygen free nitrogen containing gas at an elevated temperature to yield a component where a continuous chromium nitride layer free of iron has formed at the surface.

19 Claims, 10 Drawing Sheets

U.S. PATENT DOCUMENTS

2003/0190515 A1 10/2003 Brady et al.
2005/0238873 A1 10/2005 Brady et al.

OTHER PUBLICATIONS

Brady et.al. JOM, Aug. 2006, p. 50-57.*

Krupp et al. "Ocurrence of the Ternary pi Phase During Nitriding of Ni-Cr and Ni-Cr-Ti Alloys and its Thermodynamic Prediction", Z. Metallkunde, (2000), vol. 91, No. 12, pp. 1006-1012.

Bertrand et al. "A study of the corrosion behaviour and protective quality of sputtered chromium nitride coatings", Surface and Coatings Technology, (2006), vol. 126, pp. 199-209.

Taguchi et al. "Effect of Surface Nitriding on Corrosion Resistance of Chromium in Sulfuric Acid Solution", Materials Transactions, JIM, (1991), vol. 32, No. 12, pp. 1170-1176.

Kodenstov et al. "High-Temperature Nitridation of Ni-Cr Alloys", Metallurgical and Materials Transactions, (1996), vol. 27A, pp. 59-69.

Paulauskas et al. "Corrosion behavior of CrN, Cr sub2 N and pi phase surfaces on nitrided Ni-50Cr for proton exchange membrane feul cell bipolar plates", Corrosion Science, (2005), 15 pages.

Wang et al. "Microstructural Evolution in the Oxidized Chromium Nitride Coatings Prepared by Unbalanced Magnetron Sputtering", Journal of the Electrochemical Society, (2003), vol. 150, No. 5, pp. B199-B204.

Wei et al. "The Development of Cr sub 2 O sub 3 Scales on Iron-Chromium Alloys Contain Reactive Elements", Corros. Sci., (1989), vol. 29, No. 7, pp. 839-861.

Senna et al. "Comparative Study Between the Electrochemical Behavior of TiN, TiC sub x N sub y Hard Coatings by Using Microscopy and Electrochemical Techniques", Materials Research, (2001), vol. 4, No. 2, pp. 137-141.

Hirota et al. "Hot Isostatic Pressing of Chromium Nitrides (Cr sub 2 N and CrN) Prepared by Self-Propagating High-Temperature Synthesis", J. Am. Ceram. Soc., (2001), vol. 84, No. 9, pp. 2120-2122.

Christ et al. "Thermodynamic characteristics and numerical modeling of internal nitridation of nickel based alloys", Materials and Corrosion, (2003), vol. 54, No. 11, pp. 887-894.

* cited by examiner (a)

(b)

IRON-BASED ALLOY AND NITRIDATION TREATMENT FOR PEM FUEL CELL BIPOLAR PLATES

CROSS-REFERENCE TO RELATED APPLICATIONS

This application is a continuation-in-part (CIP) of application Ser. No. 10/403,472, entitled "CORROSION RESISTANT BIPOLAR PLATE" which was filed on Mar. 31, 2003.

STATEMENT REGARDING FEDERALLY SPONSORED RESEARCH OR DEVELOPMENT

The United States Government has rights in this invention pursuant to contract no. DE-AC05-00OR22725 between the United States Department of Energy.

FIELD OF THE INVENTION

The invention relates to surface nitrided alloys containing iron and chromium.

BACKGROUND OF THE INVENTION

Proton exchange membrane (PEM) fuel cells are of interest for power generation from hydrogen fuel due to their high efficiency and near-zero emissions. They are typically based on an ion-conductive sulphonated fluoropolymer membrane such as Nafion® and operate in the 60-80° C. temperature range. Applications range from portable power to automobiles and on-site power-generation systems. Cost and durability concerns are the key barriers to their widespread use. Among the most expensive components in PEM fuel cells, and the dominant weight and volume portion of the fuel cell stack, are the bipolar plates. The bipolar plates serve to electrically connect the anode of one cell to the cathode of another in a stack to achieve a useful voltage. The bipolar plate also separates and distributes reactant and product streams through flow-field grooves on the faces of the plates.

Presently, graphite is the benchmark material for bipolar plates due to its electrically conductive and corrosion resistant in the highly aggressive anode and cathode PEM fuel cell where the acidic environment includes leached fluoride ion at a temperature of 60-80° C. Unfortunately, the brittleness and relatively high gas permeability of graphite necessitates the use of thick plates (>2-5 mm), which lowers the power density of the fuel cell stack. Machining of flow field groves into graphite plates is also expensive, making graphite impractical for most wide-scale commercial uses. Alternative bipolar plate materials include graphite/carbon-based composites, polymer-based composites with conductive graphite/carbon fillers, and metals. However, no cost effective material has definitively established itself as capable of meeting all of the properties that have been identified for the use of PEM fuel cells in automobile applications where high power densities required and are only easily achieved with bipolar plate thicknesses less than one millimeter.

Although graphite/carbon and polymer-based composites generally exhibit excellent corrosion resistance in PEM fuel cell environments, they have to be sealed to reduce gas permeability, have brittleness issues, and are very difficult to produce at the necessary thicknesses for automotive applications. The manufacture of graphite/carbon composites can also be costly, especially when measures are taken to mitigate their property shortcomings. Polymer-based composites are the current state of the art for bipolar plates and are available commercially. Cost targets appear achievable, but through-thickness conductivities are inadequate, being less than one third of the conductivities needed for automotive applications. Better conductivities appear to be achievable with very high loadings of conductive phase additions (graphite or carbon particles, fibers, nanotubes, etc.), although this can make the plates more difficult to manufacture. The high carbon loadings also tend to make the plates brittle, especially when making thin plates on the order of 0.5 mm to 1 mm thick.

Metallic alloys such as stainless steels would be ideal as bipolar plates because they are amenable to low-cost/high-volume manufacturing methods such as stamping, offer high thermal and electrical conductivities, have low gas permeability and excellent mechanical properties, and can be readily made in foil form of approximately 0.1 mm in thickness which permits high power densities. The primary limitations of metallic alloys are high contact resistance, borderline corrosion resistance, and cost.

Despite bulk electrical conductivities that are orders of magnitude greater the anticipated need, stainless steels generally exhibit interfacial contact resistance values that are too high by an order of magnitude for the goal in automobile applications due to the passive oxide layer present on stainless steels. This oxide layer is the source of the steels corrosion resistance. On exposure to the highly aggressive PEM fuel cell environments further growth of the oxide layer can increase the interfacial contact resistance. Dissolution of metallic ions from stainless steels can also occur under PEM fuel cell operating conditions. Sulphonated fluoropolymer membranes are very sensitive to poisoning by metallic ions, and the fuel cell performance can be significantly degraded at contamination levels of the order of 10-100 ppm metallic ion. For automotive applications, the high interfacial contact resistance and borderline corrosion resistance of stainless-steel are not acceptable with conventional fuel cell designs. Other metallic materials have also been investigated as bipolar plate materials, particularly Ni—Cr, titanium, and refractory metals such as niobium and tantalum. However, the cost of these materials is generally in excess of that required for automotive applications, and interfacial contact resistance values and/or corrosion resistance are still borderline with respect to the goals.

To meet bipolar plate targets for automotive applications, metallic bipolar plates will require conductive corrosion-resistant coatings or surface treatments. Unfortunately, coatings for metallic bipolar plates have thus far not proven sufficiently viable due to local areas of inadequate surface coverage such as pin-hole defects, which result in local corrosion and metallic ion contamination of the membrane. Due to the sensitivity of the sulphonated fluoropolymer membranes to poisoning by metallic ions and the aggressiveness of the PEM fuel cell operating environment, bipolar plates require a fully dense, essentially defect-free protective coating. This is especially true for low-cost but less corrosion-resistant metal substrates such as low-alloy steels or aluminum, which can be rapidly attacked in PEM fuel cell environments. Methods to mitigate the presence of pin-hole defects (i.e., the use of interlayers) are being pursued, but can significantly increase costs. Difficulties are also encountered in obtaining full coverage of complex flow field corner and edge geometries. Hence, the need remains to modify a stainless-steel surface in a cost effective manner that is essentially defect free, corrosion resistant and does not have a prohibitive interfacial contact resistance such that metal alloys can be used in PEM fuel cells for automotive applications.

As the foreseeable costs of nickel do not appear to encourage the use of Ni—Cr based alloys for bipolar plates in an automotive application, the use of ferritic type stainless-steel alloys where nickel content is very low or non-existent is desirable. The use of nickel containing austenitic type stainless-steel, though more expensive than a ferritic type stainless-steel, would be desirable over a Ni—Cr based alloy.

SUMMARY OF THE INVENTION

A corrosion resistant electrically conductive component that can be used as a bipolar plate in a PEM fuel cell application is composed of an alloy substrate which has 10-30 wt. % Cr, 0.5 to 7 wt. % V, and the base metal Fe, and a continuous surface layer of chromium nitride and vanadium nitride essentially free of base metal. A metal oxide layer of one or more oxides selected from chromium oxide, vanadium oxide and chromium vanadium oxide can be disposed between the alloy substrate and the continuous surface nitride layer. The oxide layer can also contain nitrogen-doped metal oxide, metal oxy-nitride or metal nitride. The alloy can also contain Ni, Mn, C and/or N.

A method to prepare a corrosion resistant electrically conductive component includes providing an alloy substrate of 10-30 wt. % Cr, 0.5 to 7 wt. % V, and base metal Fe, exposing the alloy to a oxygen containing gas at an elevated temperature to form a metal oxide layer, and subsequently exposing the alloy to an oxygen free nitrogen containing gas at an elevated temperature to form the continuous surface layer of chromium nitride and vanadium nitride essentially free of base metal. The steps of exposing oxygen containing gas can be carried out in a sealed system with the oxygen containing gas also contains nitrogen such that reaction will proceed with essentially complete consumption of the oxygen leading to the subsequent exposing to the oxygen free nitrogen containing gas without the exchange of the atmosphere. The step of exposing the oxygen containing gas can be carried out at a temperature of about 700 to about 1000° C. and can be carried out for a period of time required for the formation of a chromium oxide and vanadium oxide surface layer of about 0.05 to about 0.5 mg/cm$^2$. The oxygen containing gas can contain oxygen, hydrogen, and either nitrogen, a noble gas or a mixture of nitrogen and a noble gas The oxygen containing gas can be a $N_2$—$H_2$—$O_2$ or a Ar—$H_2$—$O_2$ mixture. The oxygen containing gas can be a $N_2$-$4H_2$-$0.5O_2$ or a Ar-$4H_2$-$0.5O_2$ mixture. The step of subsequently exposing the oxygen free nitrogen containing gas can be carried out at a temperature from 800 to 1000° C. and can be carried out for a period of time required for the formation of a chromium nitride and vanadium nitride surface layer of about 0.05 to about 1 mg/cm$^2$. The step of subsequently exposing the oxygen free nitrogen containing gas can be carried out with a $N_2$—$H_2$ mixture. The step of subsequently exposing the oxygen free nitrogen containing gas can be carried out with a $N_2$-$4H_2$ mixture.

DETAILED DESCRIPTION OF THE INVENTION

Figure 1:
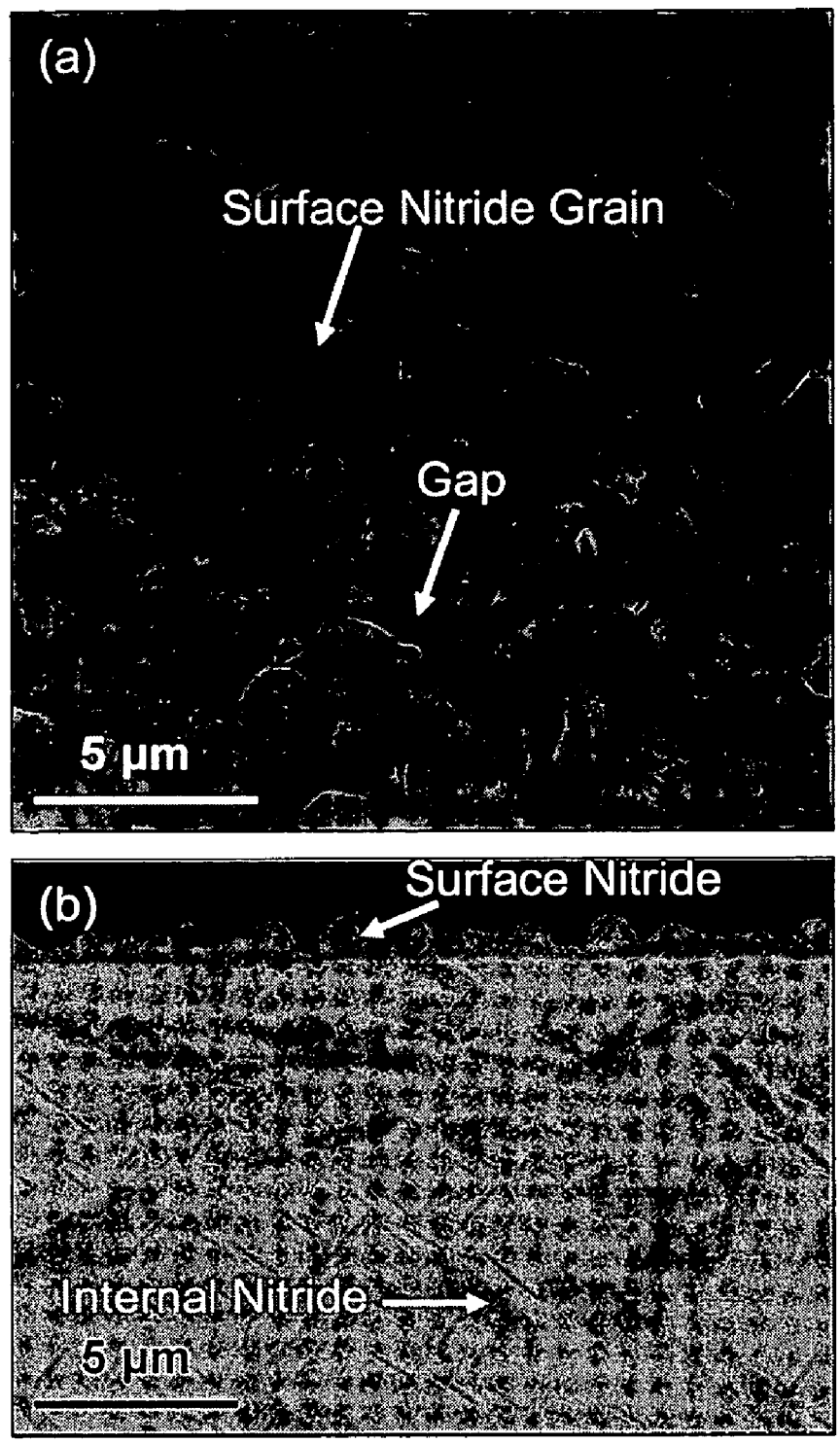
FIG. 1 are scanning-electron microscopy (SEM) cross-sections of Fe-27Cr-6V (wt. %) exposed for 4 hours at 900° C. to oxygen gettered $N_2$—$4H_2$ (a) as viewed from the surface, and (b) as viewed from a cross section.

A solution to forming a defect-free protective surface on an iron-based alloy bipolar plates has been discovered that involves the growth of a protective nitride layer comprising chromium nitride essentially free of iron on the bipolar plate alloy by high-temperature nitridation. The transition metal nitrides offer an attractive combination of high electrical conductivity and good corrosion resistance. A bipolar plate is prepared by providing an appropriate iron-based alloy which has been stamped, machined, or otherwise shaped to possess the desired geometric features of the plate, and forming a nitride surface on the alloy. The nitride surface is formed under conditions such that one or more elements of the alloy chosen to be preferentially nitrided diffuses outward from the alloy and are fixed at the surface as a nitride by reaction with an oxidizing gas and subsequently a nitriding gas to form a continuous surface layer. Pinhole defects do not form at elevated temperatures as thermodynamic and kinetic factors favor the reaction of all metal surfaces exposed to the gases. This nitridation process permits the use and retention of complex-shaped surfaces such as the edges and corners of the flow field grooves in bipolar plates. By proper selection of the alloy composition and nitridation conditions, the precipitation of internal nitrides, which does not provide corrosion protection, can be minimized or avoided while the critical external continuous nitride surface layer is formed. Alloy compositions and nitridation conditions, which yield a desired external continuous chromium nitride layer are described, and described in some detail for nickel-chromium alloys, in U.S. patent application Ser. No. 10/403,472, published as U.S.

Patent Application Publication No. 2003/0190515 which is incorporated in its entirety by reference.

For the nitridation of stainless steel alloys, the thermal nitridation approach needed for the preparation of a bipolar plate differs from the conventional ferrous alloy nitridation process that is employed to achieve surface hardening. Conventional approaches to the nitridation of stainless steel employ conditions that encourage the extensive diffusion of nitrogen into the alloy, whereby iron nitrides and/or nitrogen-saturated iron-based phases are formed that extend tens to hundreds of micrometers deep into the alloy. In contrast, bipolar plate protection requires a non-iron metallic nitride with a continuous external specific nitride layer of only a few micrometers in thickness such that corrosion resistant can be achieved without a prohibitive interfacial contact resistance. The nitride must be essentially free of iron.

A goal of the invention is to form a continuous protective CrN/Cr2N surface on ferritic-based Fe—Cr alloys by thermal nitridation. A one-step thermal nitridation is inherently difficult because commercially viable levels of chromium in ferritic stainless steel contains less than about 30 wt. % chromium to avoid domination of the alloy's properties by formation of a hard and brittle σ phase. At chromium levels less than 30%, common to most commercially available ferritic stainless steels, the permeability of nitrogen in Fe—Cr alloys is sufficiently high and internal chromium-nitride precipitation generally forms rather than the desired external, continuous chromium-nitride layer upon exposure to a nitriding gas. It was discovered that surface nitridation of a Fe-27Cr (wt. %) based alloys can be successfully carried out in a two-step process. The two-step process permits the formation of a dense external chromium-nitride surface. The process is preferably carried out using an iron-alloy that includes a ternary alloying additive such as vanadium. Stainless steel ferritic alloys with 27 wt. % chromium are commercially available 446 type stainless-steel alloys.

It was discovered while nitriding a binary Fe-27Cr alloy with in a sealed $N_2$-$4H_2$ nitriding environment, that a submicrometer thick $Cr_2O_3$ surface layer rapidly forms while heating the sample and nitriding vessel to the desired temperature of 850-900° C. This appears to occur because of a 5-10 ppm impurity of $O_2$ in the $N_2$-$4H_2$ rapidly and selectively forms oxide $Cr_2O_3$ which is more thermodynamically stable than the chromium nitrides. The initially formed $Cr_2O_3$ layer very effectively limits internal nitridation of the binary Fe-27Cr alloy. A subsequent conversion of the external chromium oxide surface to an external chromium nitride surface occurs after the oxygen impurities in the $N_2$-$4H_2$ gas are consumed from the $N_2$-$4H_2$ gas after heating for a sufficient time in a sealed environment. In contrast where oxygen free $N_2$-$4H_2$ is used for nitridation of a binary Fe-27Cr alloy, Fe-27Cr-6V, the surface region displays chromium nitride but is discontinuous and internal chromium nitride formation is extensive. The internal nitrides are readily apparent in FIG. 1 for nitridation at 900° C. for four hours in an oxygen scrubbed flowing $N_2$-$4H_2$ environment.

The two step nitridation process, and resulting chromium nitride surface containing iron alloy, is preferentially modified to by the inclusion of vanadium or other effective alloying additive to the Fe—Cr alloy to effectively enhance the initial oxide formation and limit internal nitridation. Vanadium is a preferred alloying additive. Additionally, Nb, Zr, and Ti can be included separately or in combination in addition to V to enhance the nitridation process and positively affect the nature of the continuous chromium nitride surface layer.

Figure 2:
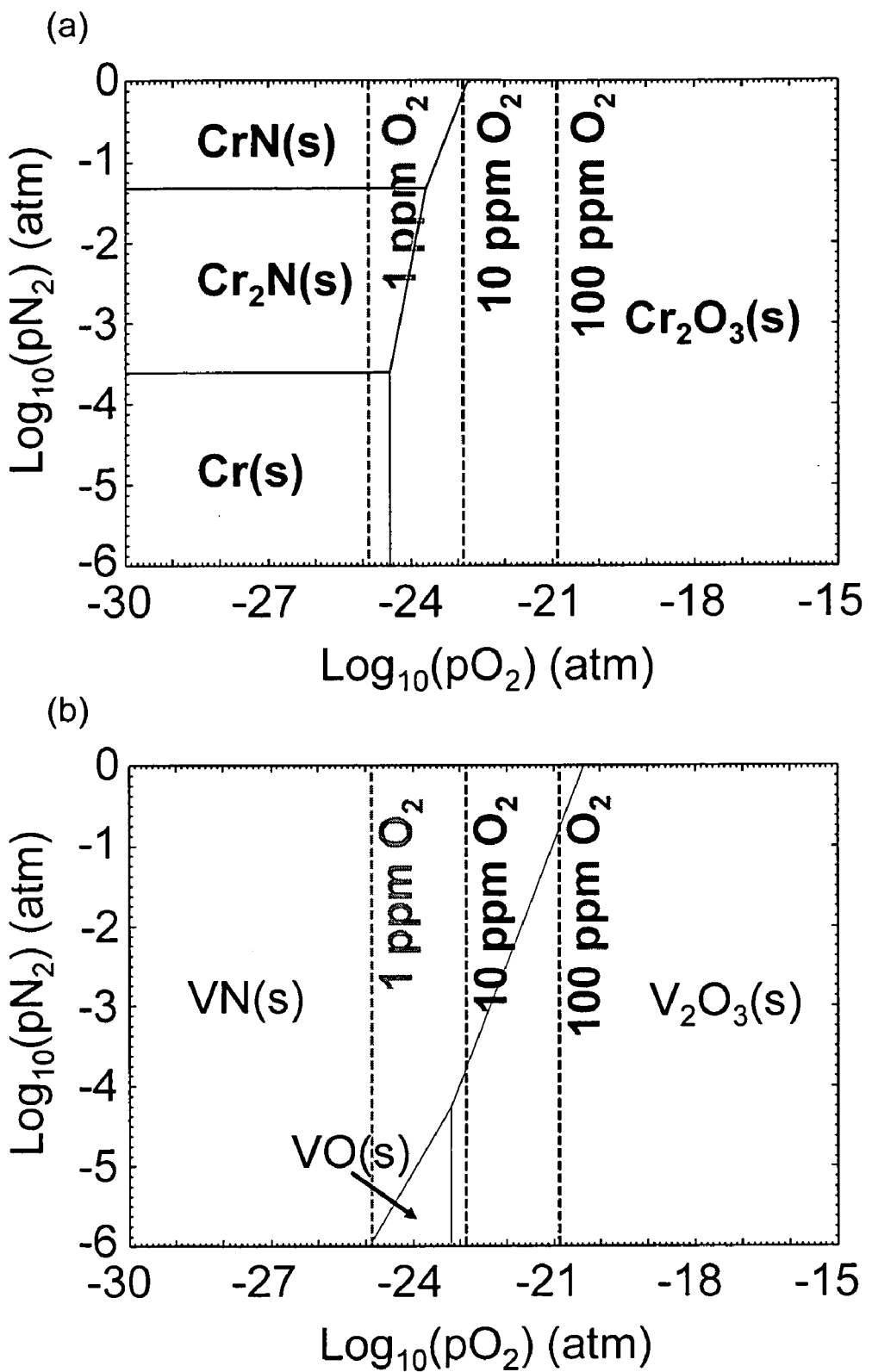
FIG. 2 are phase diagrams of (a) a Cr—N—O system and (b) a V—N—O system.

The nitridation of Fe-27Cr-2V and Fe-27Cr-6V (wt. %) can be accomplished in a sealed nitriding environment using a narrow range of $O_2$ impurity levels to yield the desired continuous chromium nitride surface layer free of iron. While nitriding Fe-27Cr-2V and 6V alloys, $O_2$ impurities in the nitriding environment results in the initial formation of a $(V,Cr)_2O_3$ surface layer during heat-up. The surface oxide subsequently converts to a dense, fully continuous vanadium-doped chromium-nitride surface layer, overlying an inter-mixed oxide/nitride region. This region is also referred to as the oxide layer but it should be understood that this oxide layer can be continuous or discontinuous and can include nitride either mixed continually with the oxide as a nitrogen doped oxide, an oxynitride, or as discrete discontinuous segments of nitride intermixed with discrete discontinuous segments of oxide. Corrosion resistance and interfacial contact resistance values were similar to those achieved by nitriding Ni-50Cr. The use of vanadium as an alloying additive appears to be effective because vanadium nitride has a greater stability relative to vanadium oxide than does chromium nitride relative to chromium oxide. This is reflected in the phase diagrams for the Cr—N—O and V—N—O systems of FIG. 2. It requires approximately 100 ppm $O_2$ to form oxide on vanadium in $N_2$-$4H_2$ at 900° C. as opposed to approximately 10 ppm to form oxide on chromium, and this relative stability effect appears to aid the conversion of the initially formed oxide to nitride. The formation of $V_2O_5$, which is toxic and exhibits a low melting point, was not observed in the final surface layer under these nitridation conditions. Vanadium is readily soluble in Fe—Cr alloys, $V_2O_3$ is readily soluble in $Cr_2O_3$, and VN and $V_2N$ are readily soluble in CrN and $Cr_2N$.

Figure 3:
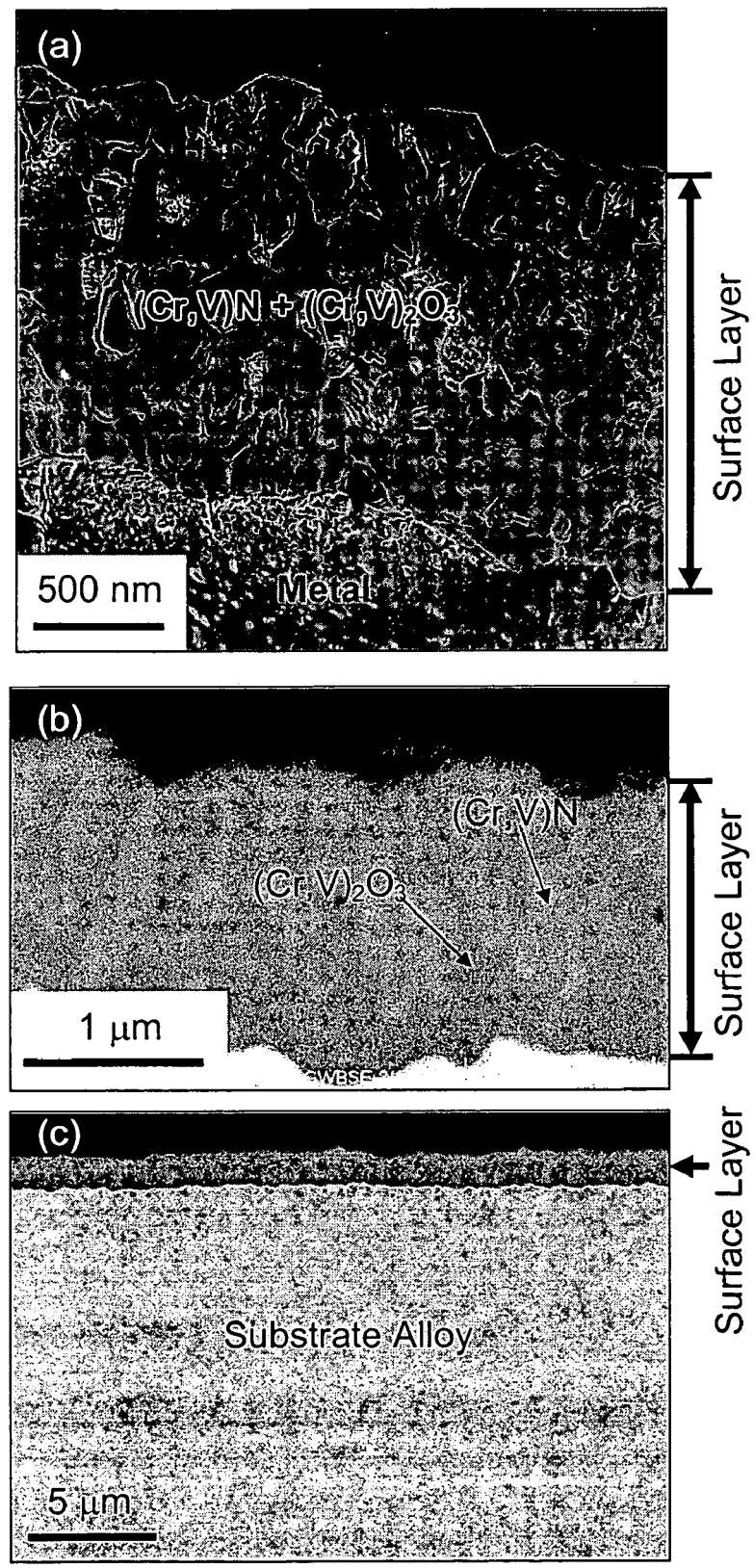
FIG. 3 are microscopy cross-sections of nitrided Fe-27Cr-6V (wt. %) (nitrided at 850° C. for 24 hours in $N_2$-$4H_2$ with oxygen impurities) at (a) very high magnification transmission electron microscopy (TEM), (b) high magnification (SEM) and (c) low magnification (SEM).
Figure 4:
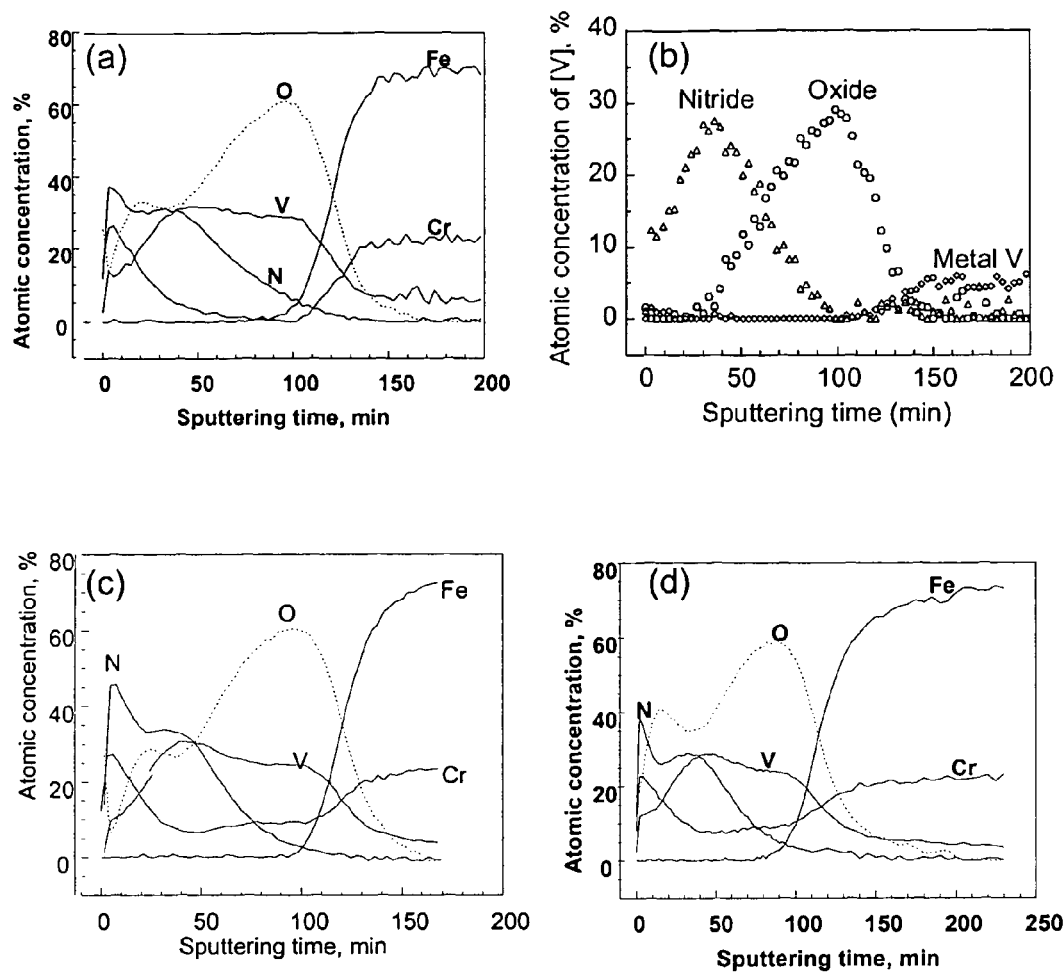
FIG. 4 are Auger electrons spectroscopy (AES) profiles of nitrided Fe-27Cr-6V (wt. %) (nitrided at 850° C. for 24 hours in $N_2$-$4H_2$ with oxygen impurities) (a) elemental distribution as nitrided, (b) vanadium distribution as nitrided, (c) after polarization in air, and (d) after polarization in $H_2$.
Figure 5:
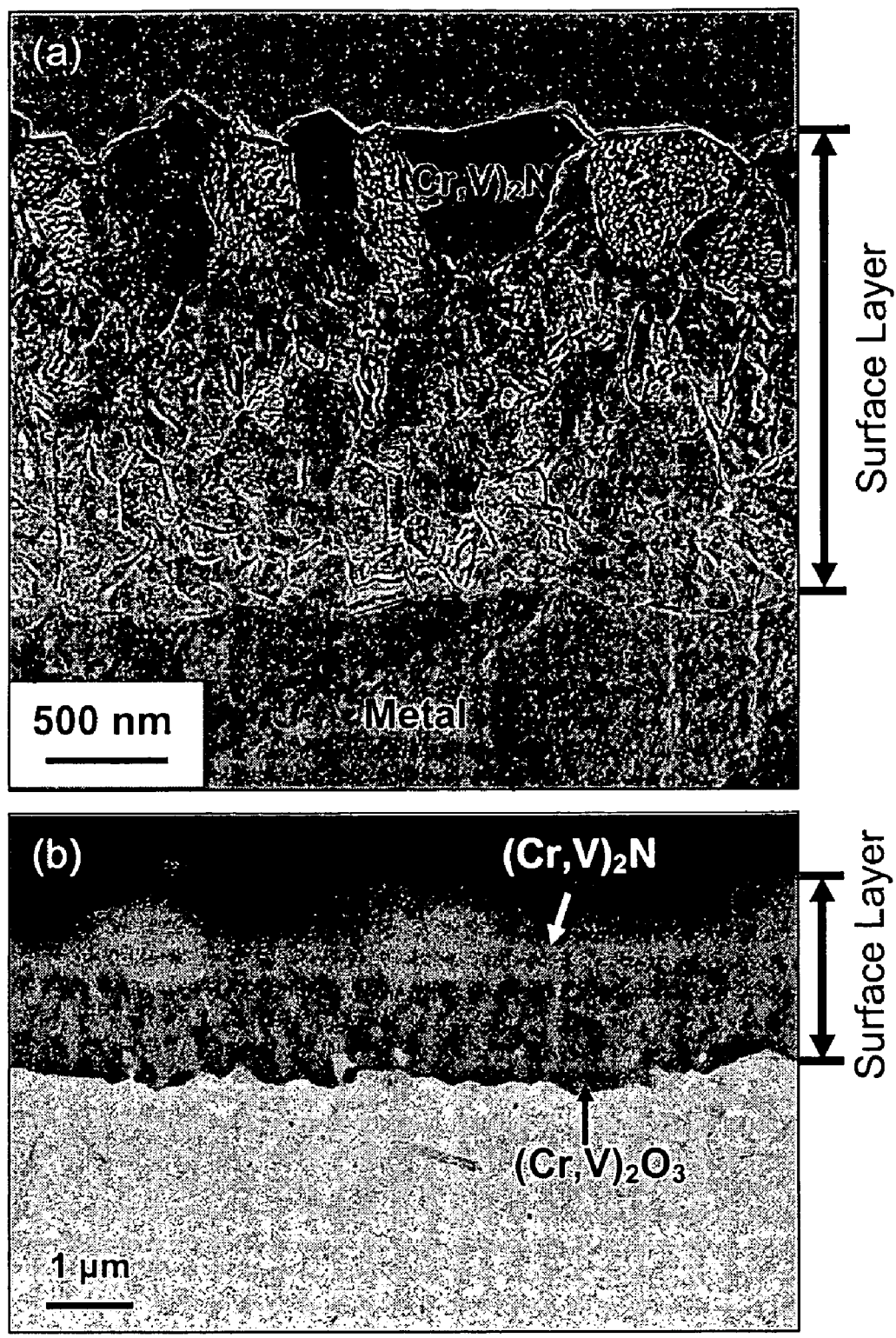
FIG. 5 are microscopy cross-sections of nitrided Fe-27Cr-6V (wt. %) (nitrided at 900° C. for 24 hours in $N_2$-$4H_2$ with oxygen impurities) at (a) very high magnification (TEM) and (b) high magnification (SEM).

A scanning-electron microscopy (SEM) cross section of the nitrided Fe-27Cr-6V alloy formed by a two-step nitridization is shown in FIG. 3. Nitridation was carried out for 24 hours at 850° C. in a $N_2$-$4H_2$ gas with oxygen impurities. The surface comprises a continuous external vanadium-doped chromium nitride layer with finger-like projections into an inner region of V—Cr oxide, consistent with $(V,Cr)_2O_3$ as identified by SEM, FIG. 3, and Auger electrons spectroscopy (AES), FIG. 4. As can be seen in FIG. 4(a) the surface, reflected by near zero sputtering time is essentially chromium and vanadium nitrides with no iron. As sputtering proceeds the proportion of nitride drops until little nitrogen is observed after about 100 minutes and only at this sputtering time is iron observed. As is very clear from FIG. 4(b) the surface is essentially nitride and proceeds through a dispersed nitride-oxide phase into an oxide phase that resides on top of a metal phase. These phases are also clearly apparent in an SEM, FIG. 5 of Fe-27Cr-6V alloy nitrided at 900° C. for 24 hours in a $N_2$-$4H_2$ gas with oxygen impurities.

Figure 6:
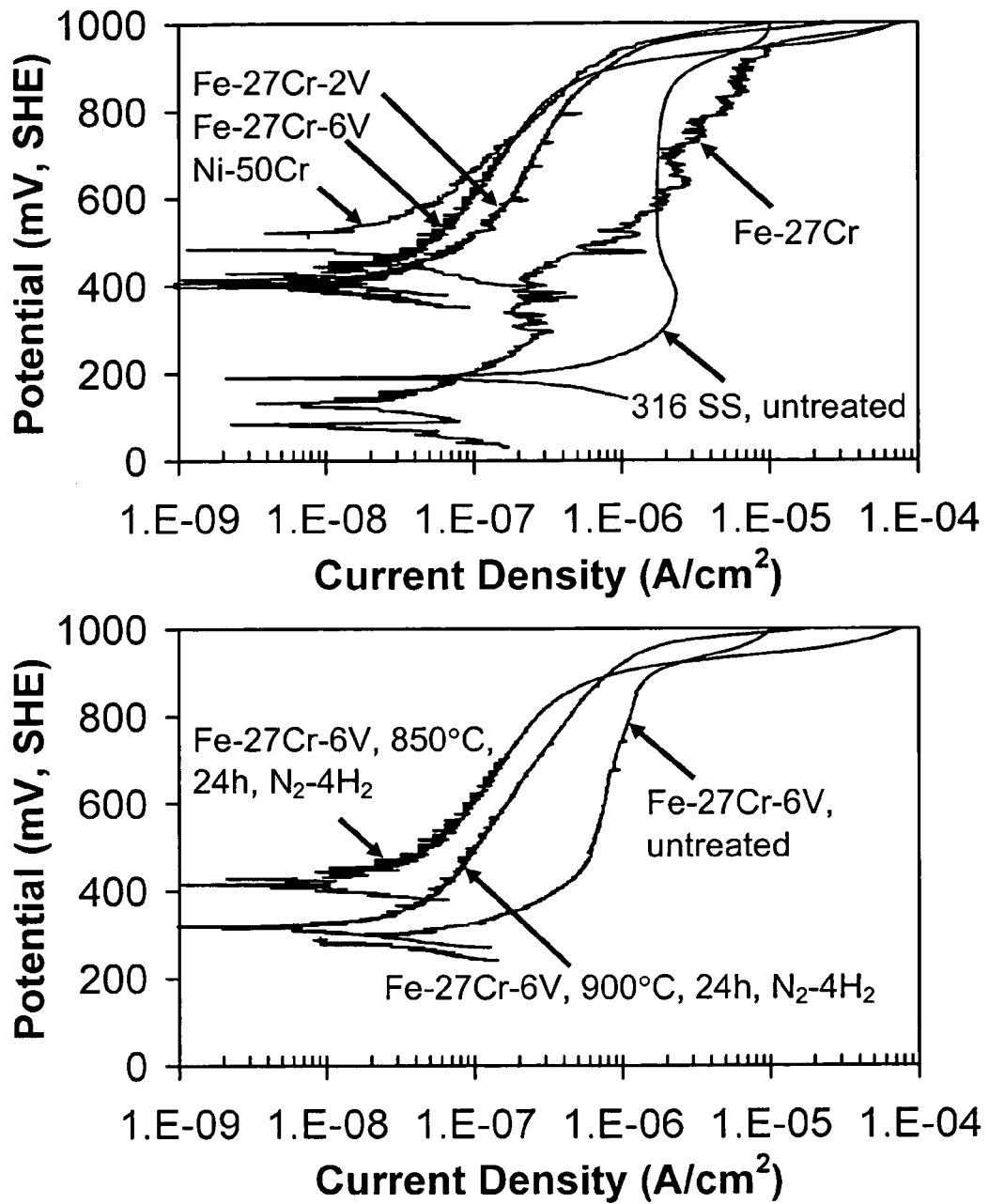
FIG. 6 are anodic polarization curves (a) for iron alloys in aerated pH 3 sulfuric acid at 80° C. and nitrided Ni-50Cr with an untreated 316 stainless-steel as a reference, and (b) for untreated Fe-27Cr-6V and nitrided Fe-27Cr-6V under two nitriding conditions.
Figure 7:
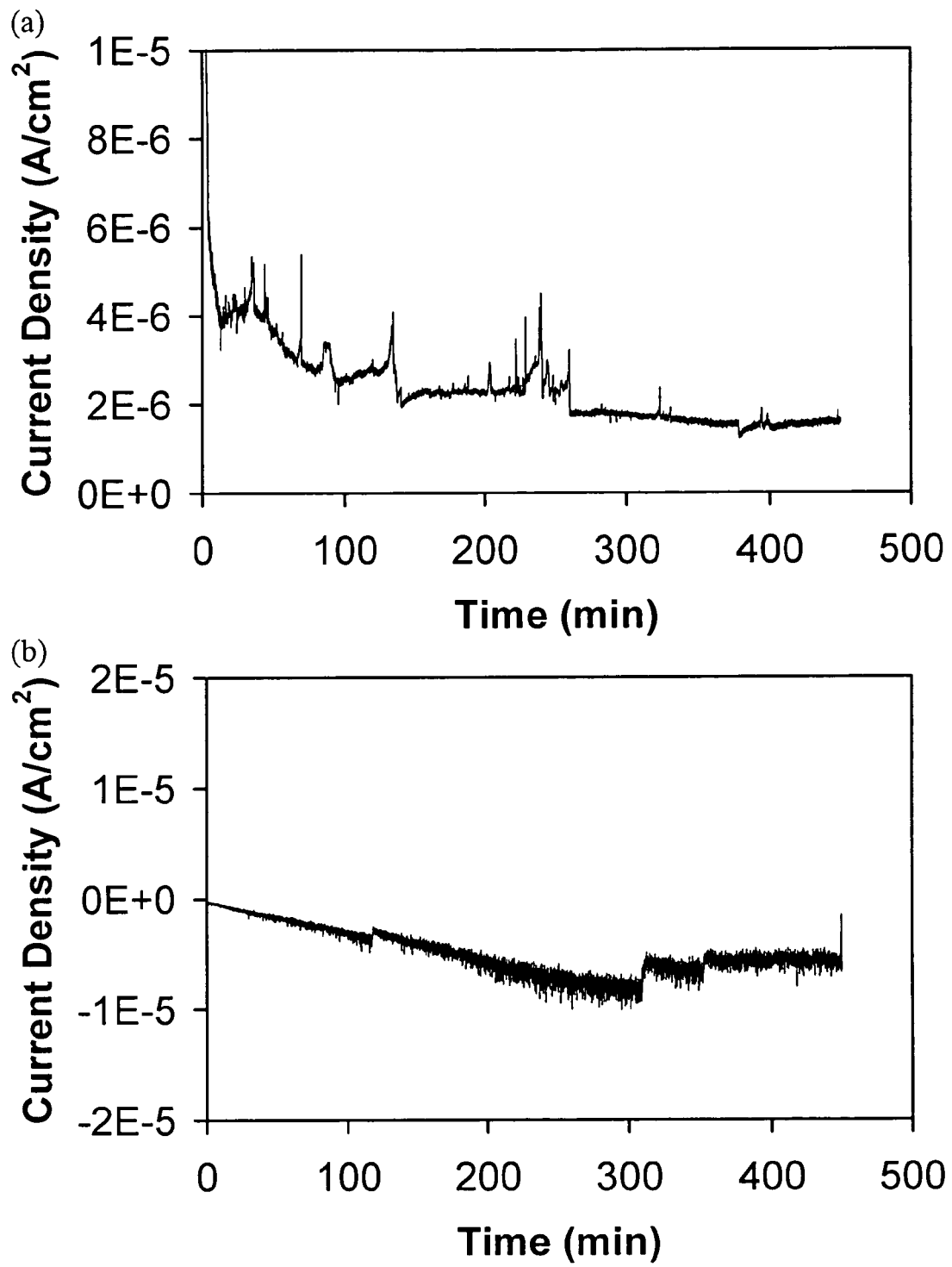
FIG. 7 are static polarization plots of nitrided Fe-27Cr-6V (850° C., 24 hr, $N_2$-$4H_2$ with oxygen impurities) for polarization of 7.5 hr in pH 0 sulfuric acid+2 ppm F$^-$ at 70° C. (a) with an air purge and (b) with a $H_2$ purge.

FIG. 4 also shows AES data for the Fe-27Cr-6V alloy nitrided at 850° C. for 24 hours in a $N_2$-$4H_2$ gas with oxygen impurities followed by polarization in aerated pH 3 sulfuric acid with 2 ppm fluoride ion at 80° C. for 7.5 hours, FIG. 4(c), and polarization in $H_2$ purged pH 3 sulfuric acid with 2 ppm fluoride ion at 80° C. for 7.5 hours, FIG. 4(d). In both cases the surface remained essentially a mixture of chromium and vanadium nitrides. FIG. 6 gives the anodic polarization curves for samples aerated in pH 3 sulfuric acid at 80° C. FIG. 6(a) show curves for Fe-27Cr-6V, Fe-27Cr-2V, and Fe-27Cr nitrided for 24 hours at 850° C. in a $N_2$-$4H_2$ gas with oxygen impurities. The curves for Fe-27Cr-6V and Fe-27Cr-2V are similar to Ni-50Cr nitrided at 1,100° C. for 2 hr in $N_2$ which is a sample known to sufficiently meet the corrosion demands on bipolar plates that have been identified as requirements for a PEM fuel cell environment. The excellent stability of these nitride layers is illustrated in FIG. 7 where the static polarization at 850 mV of nitrided Fe-27Cr-6V (850° C., 24 hr, $N_2$-$4H_2$ with $O_2$ impurities) is measured in the extremely aggressive environment of pH 0 sulfuric acid with 2 ppm fluoride ion at 70° C. with an air purge (a PEM fuel cell cathode environment) and a $H_2$ purge (a PEM fuel cell anode environment). The current density remained low, below $1 \times 10^{-5}$ A/cm$^2$ over an eight hour period.

Figure 8:
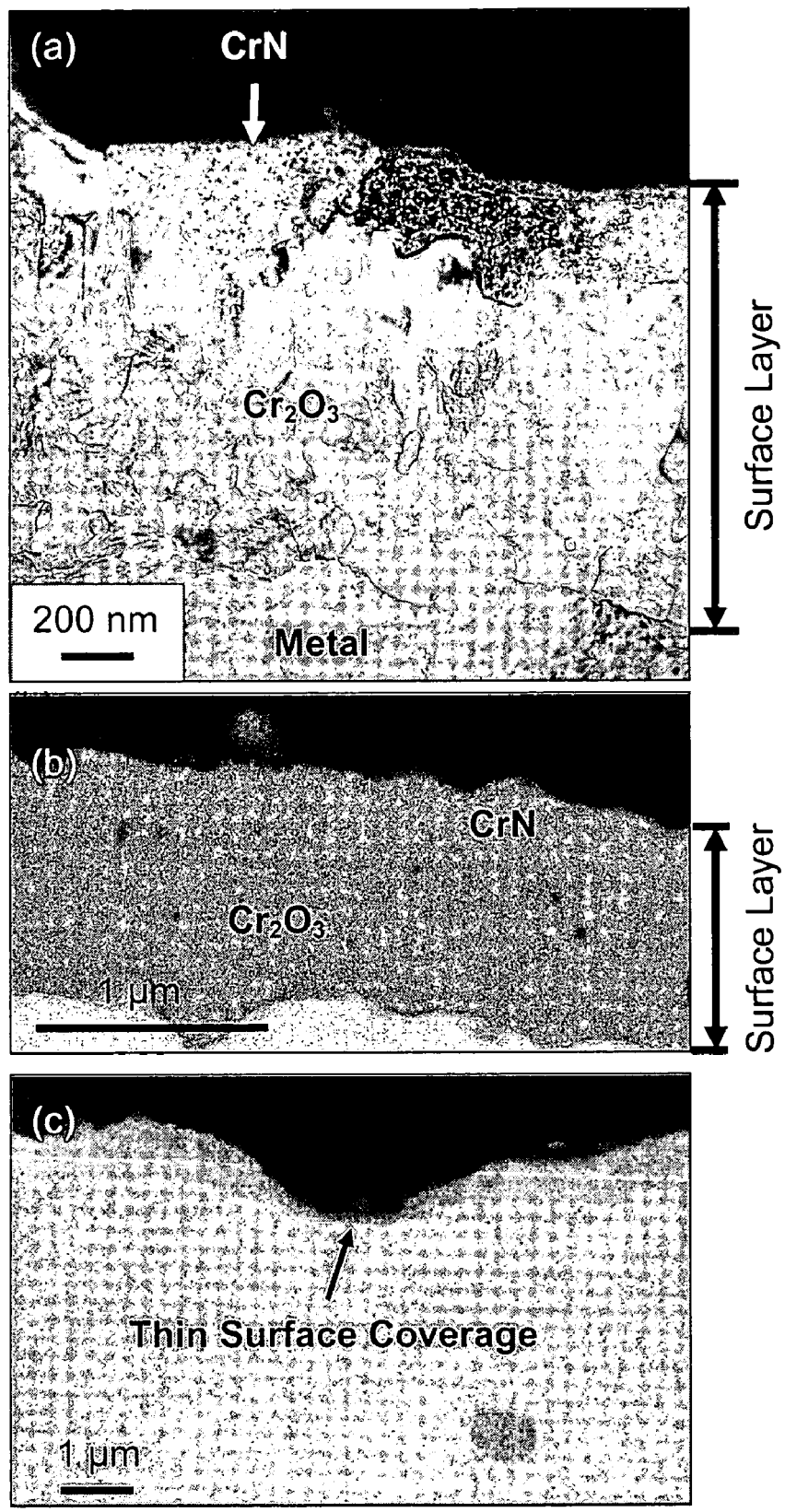
FIG. 8 are microscopy cross-sections of nitrided Fe-27Cr (wt. %) (nitrided at 850° C. for 24 hours in $N_2$-$4H_2$ with oxygen impurities) at (a) very high magnification (TEM), (b) high magnification (SCM) and (c) low magnification (SCM).

The advantage of the inclusion of the alloying additive, vanadium, is also illustrated in FIG. 6(a) as the curve for Fe-27Cr, an alloy free of the additive, is inferior to those containing vanadium with higher current densities at all potentials. The value of the alloying additive for promoting the formation of a continuous surface layer is reflected in FIG. 8 which displays a SEM of nitrided Fe-27Cr (850° C., 24 hr, $N_2$-$4H_2$ with $O_2$ impurities) where one can observe occasional gaps in the surface coverage due to thin oxide coverage in some areas as can be seen in FIG. 8(c). When the oxide layer is too thin, the subsequent nitridation can consume the entire oxide layer permitting internal nitridation and loss of the necessary surface nitride continuity.

As it is not practical to rely on impurity levels of oxygen in a sealed atmosphere to fabricate a conductive component the two steps of the nitridation were carried out by exposure of the alloy to an oxidizing gas and then a nitriding gas. The oxidizing gas can contain $H_2$, $O_2$ and $N_2$. A noble gas, such as Ar can be substituted for the $N_2$ or can be included with the $N_2$. Excellent nitrided surfaces can be formed by exposure of the iron-chromium alloy to 93.5$N_2$-4$H_2$-0.5$O_2$ or 93.5Ar-4$H_2$-0.5$O_2$ oxidizing gases for various combinations of time and temperature followed by exposure to a nitriding gas such as $N_2$-$4H_2$ essentially free of oxygen for various combinations of time and temperature. Although the two gases can be employed by exposing the component in a sealed vessel under a static oxidizing gas and subsequently sealing the component under a static nitriding gas, it is preferred that the oxidizing and nitriding gases are flowing to maintain a constant composition of the various gases to the exposed surfaces of the conductive component. For 93.5$N_2$-4$H_2$-0.5$O_2$ or 93.5Ar-4$H_2$-0.5$O_2$ oxidizing gases, the exposure to the oxidizing gas can be carried out at a temperature of 700 to 1,000° C. and preferably at a temperature of about 800 to about 900° C. for a period of time sufficient to have a weight change of 0.05 to 0.5 mg/cm$^2$ of alloy and preferably about 0.1 to about 0.3 mg/cm$^2$. For these conditions a sufficient period of time is about 0.5 to about 4 hours. The use of other gas compositions are possible and the necessary time and temperature of the oxidation step can be determined for the gas composition by observing the weight change per surface area of the alloy. The exposure to the oxygen free nitriding gas can be carried out at 800 to 1,000° C., and preferably from about 850 to about 950° C. for a period of time sufficient to have a additional weight change of 0.05 to 1 mg/cm$^2$ for the oxidized alloy, and preferably about 0.1 to about 0.3 mg/cm$^2$. When using $N_2$-$4H_2$, exposure can be from about 2 to about 24 hours. Again other oxygen-free gas nitriding gases can be used and one can determine the necessary time and temperature for exposure by observing the weight change per surface area of the oxidized alloy.

Figure 9:
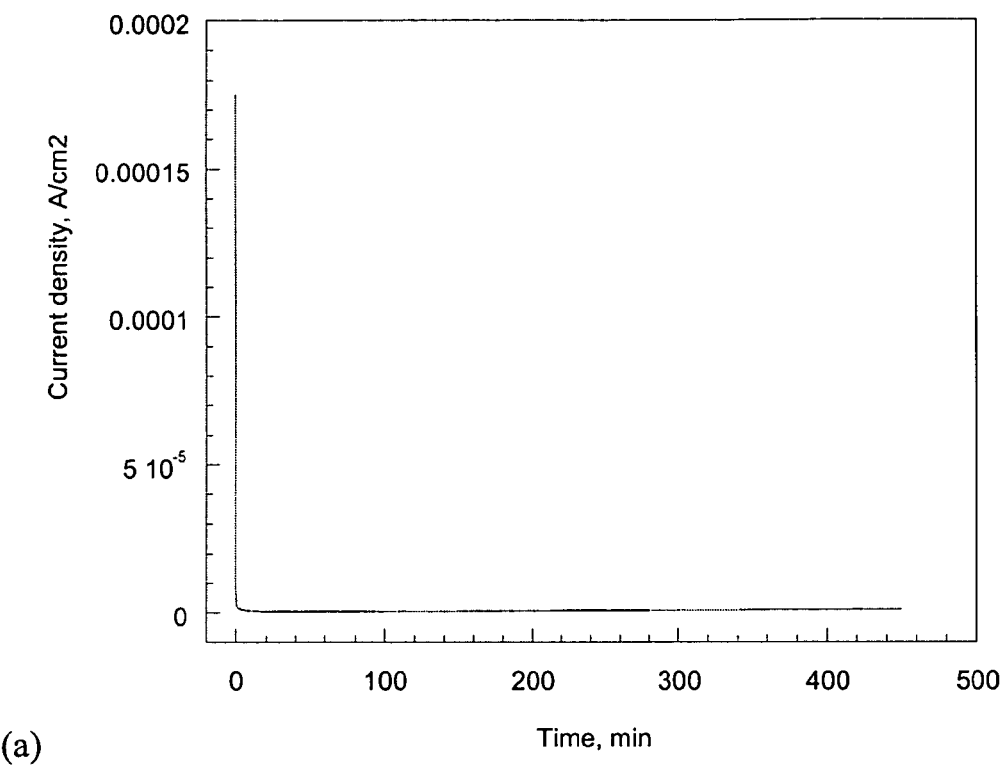
FIG. 9 show (a) the polarization at 70° C. in aerated 1M $H_2SO_4$ with 2 ppm F$^-$ over a 7.5 hour period at 840 mV vs SHE and (b) the interfacial contact resistance before and after polarization for Fe-27Cr-6V nitrated by exposure to Ar-$4H_2$-$0.5O_2$ at 800° C. for 30 minutes followed by exposure to $N_2$-$4H_2$ at 900° C. for 8 hours.
Figure 9:
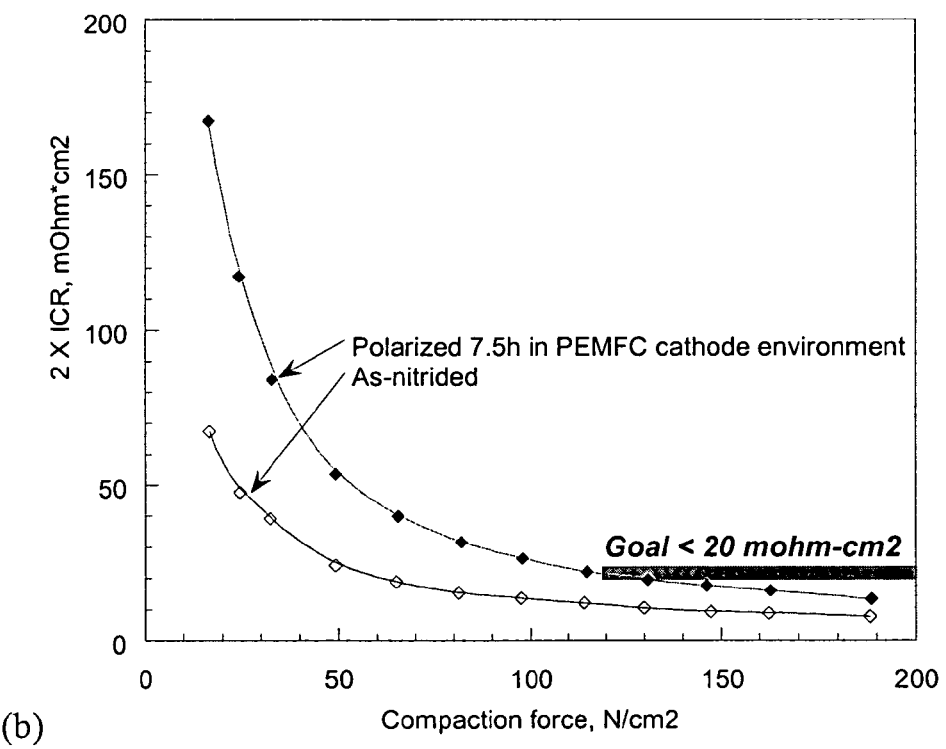

Coupons of Fe-27Cr-6V were nitrated by exposure of the alloy to 93.5Ar-4$H_2$-0.5$O_2$ at 800° C. for 30 minutes resulting in a mass increase of 0.05 mg/cm$^2$ followed by exposure to $N_2$-$4H_2$ at 900° C. for 8 hours resulting in a mass increase of 0.34 mg/cm$^2$. The static polarization plot at 840 mV, FIG. 9(a) for this nitrided alloy in 1M sulfuric acid with 2 ppm fluoride ion rapidly stabilized to a current of 0.5 to 1.2 μA/cm$^2$ for 8 hours, indicative of excellent corrosion resistance. The interfacial contact resistances (ICR) for this coupon is shown in FIG. 9(b) with the plotted resistance is two times the measured resistance as only one face of the coupon was polarized. As can be seen in FIG. 9(b) the resistances before and after cathode polarization were excellent and below the target resistance for use as a bipolar plate in a PEM fuel cell of 20 mohm-cm$^2$ at compaction forces above 120 N/cm$^2$.

Figure 10:
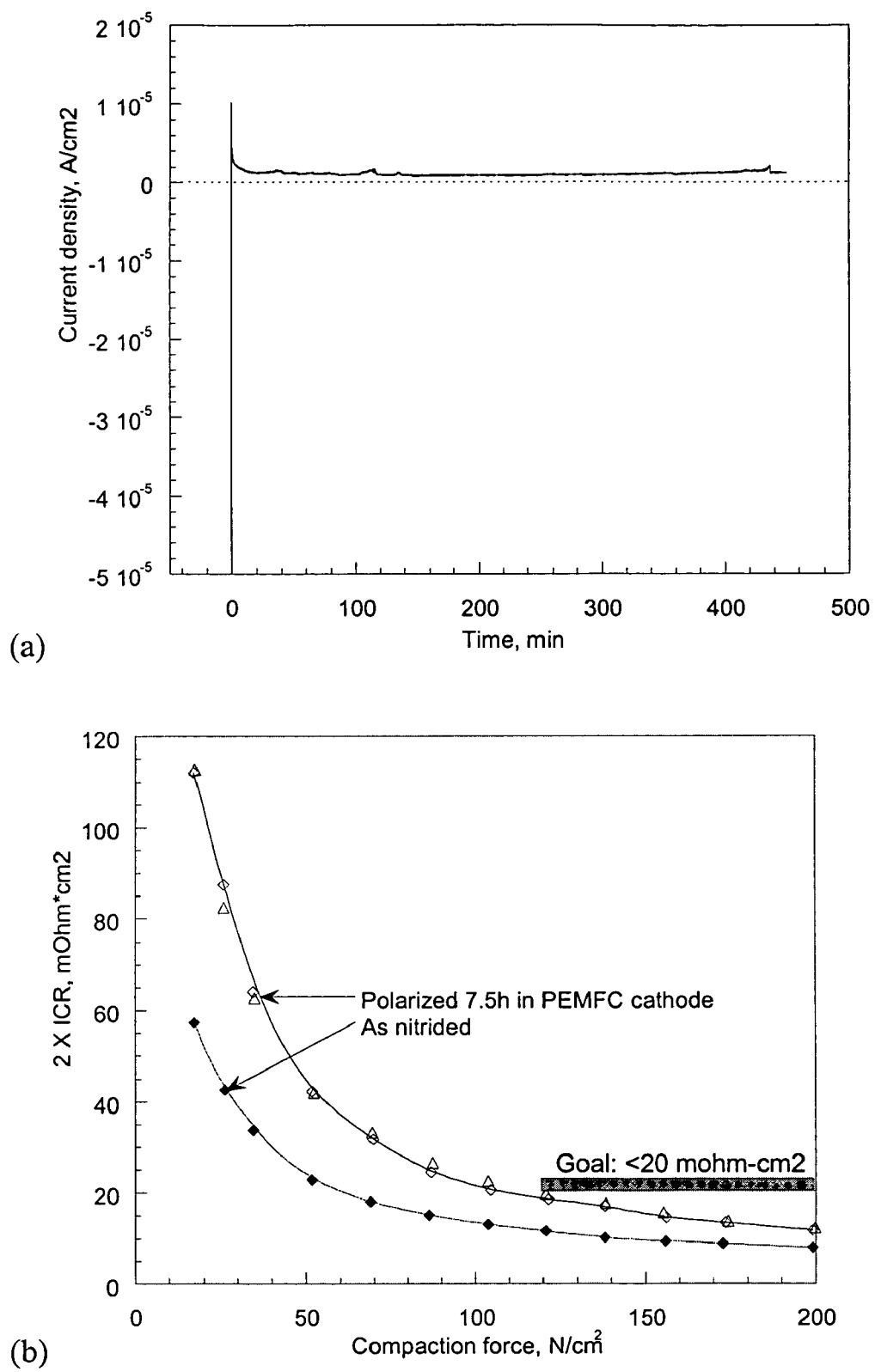
FIG. 10 show (a) the polarization at 70° C. in aerated 1M $H_2SO_4$ with 2 ppm F$^-$ over a 7.5 hour period at 840 mV vs SHE and (b) the interfacial contact resistance before and after polarization for Fe-27Cr-6V nitrated by exposure to $N_2$-$4H_2$-$0.5O_2$ at 900° C. for 30 minutes followed by exposure to $N_2$-$4H_2$ at 900° C. for 8 hours.

Similarly, coupons of Fe-27Cr-6V were nitrated by exposure of the alloy to 93.5$N_2$-4$H_2$-0.5$O_2$ at 900° C. for 30 minutes resulting in a mass increase of 0.12 mg/cm$^2$ followed by exposure to $N_2$-$4H_2$ at 900° C. for 8 hours resulting in a mass increase of 0.12 mg/cm$^2$. The static polarization plot at 840 mV, FIG. 10(a) for this nitrided alloy in 1M sulfuric acid with 2 ppm fluoride ion rapidly stabilized to a current of 1 to 2 μA/cm$^2$ for 8 hours, indicative of excellent corrosion resistance. The interfacial contact resistances (ICR) for this coupon is shown in FIG. 10(b) with the plotted resistance is two times the measured resistance as only one face of the coupon was polarized. As can be seen in FIG. 10(b) the resistance before and after cathode polarization were excellent and below the target resistance for use as a bipolar plate in a PEM fuel cell of 20 mohm-cm$^2$ at compaction forces above 120 N/cm$^2$.

A further advantage of the two-step nitridation process, where oxidation is used to initially enrich the surface in chromium and vanadium prior to converting to a nitride, is that selective oxidation may be accomplished at relatively low levels of chromium and vanadium due to the low solubility of oxygen in iron-based alloys and the high thermodynamic stability of $Cr_2O_3$ and $V_2O_3$. For this reason the composition range amenable to this two step nitridation approach can be carried out down to levels of about 10 wt. % chromium and about 0.5 wt. % vanadium. A preferred alloy composition of the alloy comprises 15 to 30 percent by weight chromium, 0.5 to 6 percent by weight vanadium, and base metal iron. A more preferred alloy composition comprises 20 to 27 percent chromium, 0.5 to 6 percent by weight vanadium, and base metal iron.

In addition the ferritic alloys described above, austenic alloys, which have good ductility, with vanadium can also be used for the preparation of the component. The austenic phase can be stabilized by the addition, independently or in combination, of Ni, Mn, C and N.

The bipolar plate of this invention allows an easily and economically manufactured PEM fuel cell or other electrochemical-based power generator by having a continuous corrosion resistant nitrided surface formed on a stainless steel alloy that may contain little or no nickel. The components can be formed such that identified goals of corrosion resistance, interfacial contact resistance, electrical conductivity, weight, flexibility, flexural strength, and cost can be achieved for use in automotive applications.

It is to be understood that while the invention has been described in conjunction with the preferred specific embodiments thereof, that the foregoing description as well as the examples that followed are intended to illustrate and not limit the scope of the invention. Other aspects, advantages and modifications within the scope of the invention will be apparent to those skilled in the art to which the invention pertains.

We claim:

1. A corrosion resistant electrically conductive component, comprising:
    an alloy substrate comprising 10-30 wt. % Cr, 0.5 to 7 wt. % V, and base metal comprising Fe; and
    a continuous intermixed oxide-nitride surface layer essentially free of base metal comprising at least one nitride selected from the group consisting of chromium nitride, vanadium nitride, and a combination of chromium nitride and vanadium nitride, wherein a contact resistance of said component is less than 20 mohm-cm$^2$ at compaction pressures above 120 N/cm$^2$, and wherein said continuous intermixed oxide-nitride surface layer comprises chromium and a vanadium phase selected from the group consisting of vanadium oxide, vanadium nitride, chromium vanadium nitride, vanadium-doped chromium oxide, and a combination thereof.

2. The corrosion resistant electrically conductive component of claim 1, wherein said nitride comprises a form selected from the group consisting of nitrogen doped metal oxide, metal oxynitride and discrete discontinuous segments of nitride.

3. The corrosion resistant electrically conductive component of claim 1, wherein said continuous intermixed oxide-nitride surface layer comprises at least one oxide selected from the group consisting of chromium oxide, vanadium oxide and chromium vanadium oxide.

4. The corrosion resistant electrically conductive component of claim 3, wherein said at least one nitride comprises a form selected from the group consisting of nitrogen doped metal oxide, metal oxynitride or discrete discontinuous segments of nitride.

5. The corrosion resistant electrically conductive component of claim 1, where said at least one nitride comprises discrete discontinuous segments of nitride.

6. The corrosion resistant electrically conductive component of claim 1, wherein said wt. % Cr is 20-27%.

7. The corrosion resistant electrically conductive component of claim 1, wherein said wt. % V is 0.5-6%.

8. The corrosion resistant electrically conductive component of claim 1, wherein said alloy substrate further comprises at least one element selected from the group consisting of Ni, Mn, C and N.

9. A method to prepare a corrosion resistant electrically conductive component, comprising the steps of:

providing an alloy substrate comprising 10-30 wt. % Cr, 0.5 to 7 wt. % V, and base metal comprising Fe, exposing said alloy to a oxygen containing gas at an elevated temperature, and subsequently exposing said alloy to an oxygen free nitrogen containing gas at an elevated temperature to produce the corrosion resistant electrically conductive component of claim 1.

10. The method of claim 9, wherein said step of exposing is carried out in a sealed system wherein said oxygen containing gas also contains nitrogen such that reaction will proceed with essentially complete consumption of said oxygen and forming said oxygen free nitrogen containing gas for subsequent exposing to said oxygen free nitrogen containing gas without exchange of gases in the sealed system.

11. The method of claim 9, wherein said step of exposing is carried out at a temperature of 700 to 1.000° C.

12. The method of claim 11, wherein said step of exposing is carried out with a gas containing $H_2$, $O_2$ and either $N_2$, a noble gas, or $N_2$ and a noble gas.

13. The method of claim 12, wherein said step of exposing is carried out with a $N_2$—$H_2$—$O_2$ or Ar—$H_2$—$O_2$ mixture.

14. The method of claim 13, wherein said step of exposing is carried out with a $N_2$-4$H_2$-0.5$O_2$ or Ar-4$H_2$-0.5$O_2$ mixture.

15. The method of claim 12, wherein said step of exposing is carried out for a period of time required for the formation of a chromium oxide and vanadium oxide surface layer of about 0.05 to about 0.5 mg/cm$^2$.

16. The method of claim 9, wherein said step of subsequently exposing is carried out at a temperature from 800 to 1000° C.

17. The method of claim 16, wherein said step of subsequently exposing is carried out with a $N_2$—$H_2$ mixture.

18. The method of claim 17, wherein subsequently exposing said oxygen free nitrogen containing gas is carried out with a $N_2$-4$H_2$ mixture.

19. The method of claim 16, wherein subsequently exposing said oxygen free nitrogen containing gas is carried out for a period of time required for the formation of a chromium nitride and vanadium nitride surface layer of about 0.05 to about 1 mg/cm$^2$.

* * * * *